United States Patent [19]

Caprioli

[11] 4,070,935
[45] Jan. 31, 1978

[54] CHUCKING DEVICE FOR A MACHINE TOOL

[75] Inventor: Bruno Caprioli, Basano del Grappa, Italy

[73] Assignee: Forkardt, Gefitec, Zug, Switzerland

[21] Appl. No.: 757,653

[22] Filed: Jan. 7, 1977

[30] Foreign Application Priority Data

Apr. 9, 1976 Switzerland .......................... 4570/76

[51] Int. Cl.² ............................................. B23B 31/30
[52] U.S. Cl. ....................................... 82/40 R; 82/30; 279/4
[58] Field of Search ....................... 82/40 R, 40 A, 30; 279/4

[56] References Cited

U.S. PATENT DOCUMENTS

| | | | |
|---|---|---|---|
| 3,516,680 | 6/1970 | Andre | 279/4 |
| 3,814,448 | 6/1974 | Buck | 279/4 |
| 3,815,929 | 6/1974 | Steinberger et al. | 82/40 R |
| 3,933,061 | 1/1976 | Link | 82/30 |

*Primary Examiner*—Leonidas Vlachos
*Attorney, Agent, or Firm*—Walter Becker

[57] ABSTRACT

A chucking device for a machine tool, especially a turning machine, in which a chuck body has radial recesses in which jaws are slidable while the actuating bars in the chuck body engage teeth on the jaws to move the jaws in and out as the bars reciprocate. A gear coaxial with the chuck body is tangential to the bars and meshes with teeth thereon, while a rotary motor in the chuck body is adjacent to and is directly connected with said gear.

8 Claims, 7 Drawing Figures

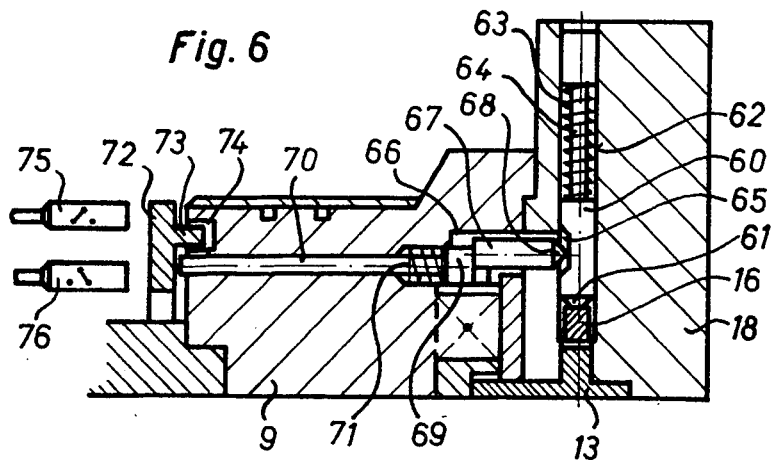
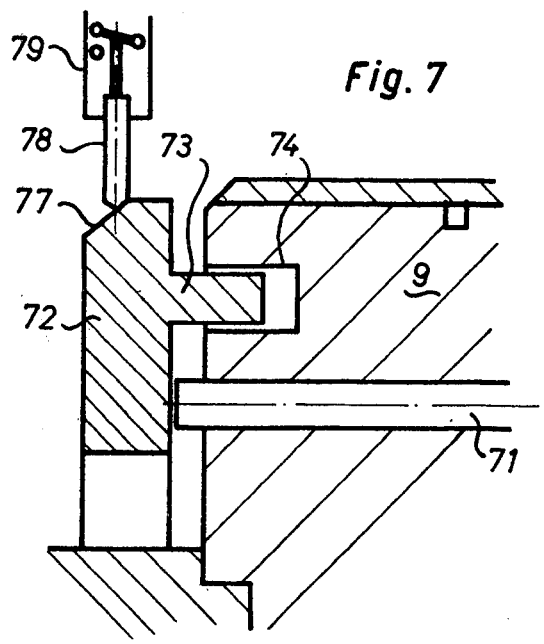

CHUCKING DEVICE FOR A MACHINE TOOL

The present invention relates to a chucking device for a machine tool, especially a turning machine, with a chuck in which the chuck jaws are adapted to be driven radially by a driving wheel arranged coaxially with regard to the machine spindle, through the intervention of key bars or racks by means of a gearing, said bars or racks being adapted to be moved tangentially with regard to said driving wheel. These bars or racks are adapted at the end of their stroke to be disengaged from their mesh with the chuck jaws. The driving wheel is adapted to be rotated by a rotary piston unit which comprises a housing with chambers and a rotary piston. The said rotary piston comprises piston wings movable in said chambers and projecting from a hub in a star-shaped manner.

Chucking devices for turning machines have become known. Most devices of this type as they are practically used comprise a chuck and a clamping device which is operable pneumatically, hydraulically, or electrically. Such clamping device axially displaces a pull rod which in the chuck brings about a radial movement of the chuck jaws through the intervention of levers or wedges. Such clamping tools are suitable only for disc-shaped workpieces. If rod-shaped workpieces are involved, the chuck and the clamping device each have to be provided with a passage or bore and have to be coupled to each other by means of a pull pipe. This pull pipe, however, takes up a considerable portion of said passage or bore. Therefore, for some time clamping devices have become known under the name of "front end chuck" which in most instances are actuated hydraulically. These clamping devices concern compact clamping devices which comprise the chuck and an oil pressure cylinder. The oil under pressure is by means of a feeding ring through annular passages or through the spindle conveyed to the clamping devices. In the last mentioned instance, the feeding passages are located between the main bearings for the rotating spindle. With turning machines which are equipped with hydraulic installations, this design offers considerable advantages. The disengaging possibility of the jaws necessary with the rack chuck system, which permit an offsetting and exchange of the jaw unit can in a particularly advantageous manner be employed in connection with numerically controlled machines because the change-over to other clamping diameters can in comparison to heretofore known systems of the jaw connection be carried out in a simple and fast manner by means of base jaws connected to the chuck and provided with cross offset and pointed to the construction. With conventional power chucks with wedge-type hooks, it is particularly advantageous when the connection of the auxilliary or face jaw on the base jaw consists of gearing or teeth which permits a change in the clamping diameter merely by loosening screws. The fast jaw exchange in rack systems has become known for instance by German Pat. No. 2,007,509 describing a front end design, according to which the driving cylinder and the chuck are combined to a unit and are connected to the front spindle. This system, however, has not yet been adopted in the art. With the rack jaws to be described, the base jaws are displaced radially by means of racks which are tangentially actuated by means of a central driving wheel. Due to the helical gearing on the racks and on the base jaws, the jaw stroke will be brought about and the torque of the driving wheel is converted into a radial clamping force. For purposes of driving the mentioned gear there is provided a rotary piston unit in which a hub is rotatably arranged within an annular housing. This hub comprises three piston wings which project in a star-shaped manner. These piston wings move in an arc-shaped chamber which extends along a portion of the circumference of the housing in a circumferential direction and are actuated by a pressure medium flowing into said chambers, so that the hub rotates. This clamping device is, however, no front end chuck because the rotary piston unit is located at the rear end of the rotating machine spindle and is connected to the chuck located at the front end of the spindle, through the intervention of a torsion pipe surrounding said spindle. While in this way the drawback of most front end chucks, namely the feeding of the pressure medium in the chip removing space, i.e., in the working range of the rotary machine, is avoided, it is necessary that not only the torsion tube is designed as a strong element in order to be able to convey the high torque of the rotary piston unit (500 to 1000 mkg), depending on the size, but also the spindle has to be a very strong element because it has to absorb the reaction torque. In addition to the required stability for absorbing this torque, the spindle has to be sufficiently rigid against shattering cut so that the design is applicable only with spindles which are anyhow designed as very strong elements. Such rotary spindles have particularly large main bearings which, however, heat up unduly in view of the high speed of the anti-friction bearings when turning at high speed. Furthermore, with a given bore (for instance, with changing over from an available machine to this design) it is necessary to reduce the diameter of the rotating spindle in order to provide for sufficient space for the torsion tube so that the connection of the rotary piston unit at the end of the rotary spindle has to be designed particularly carefully.

It is, therefore, an object of the present invention to provide a clamping device which will overcome the above mentioned drawbacks and will keep away the above outlined stresses from the rotary spindle.

It is another object of the present invention to provide a clamping device as set forth in the preceding paragraph in which the flow of power will occur completely within the device itself.

These and other objects and advantages of the invention will appear more clearly from the following specification in connection with the accompanying drawings, in which:

FIG. 6 illustrates in section a first embodiment of the control ring and the actuating members therefor.

FIG. 7 is a second embodiment of the control ring according to the invention but on a larger scale.

The clamping device according to the present invention is characterized primarily in that the driving wheel is connected directly to the rotary piston without the interposition of a rotary pipe.

Figure 1:
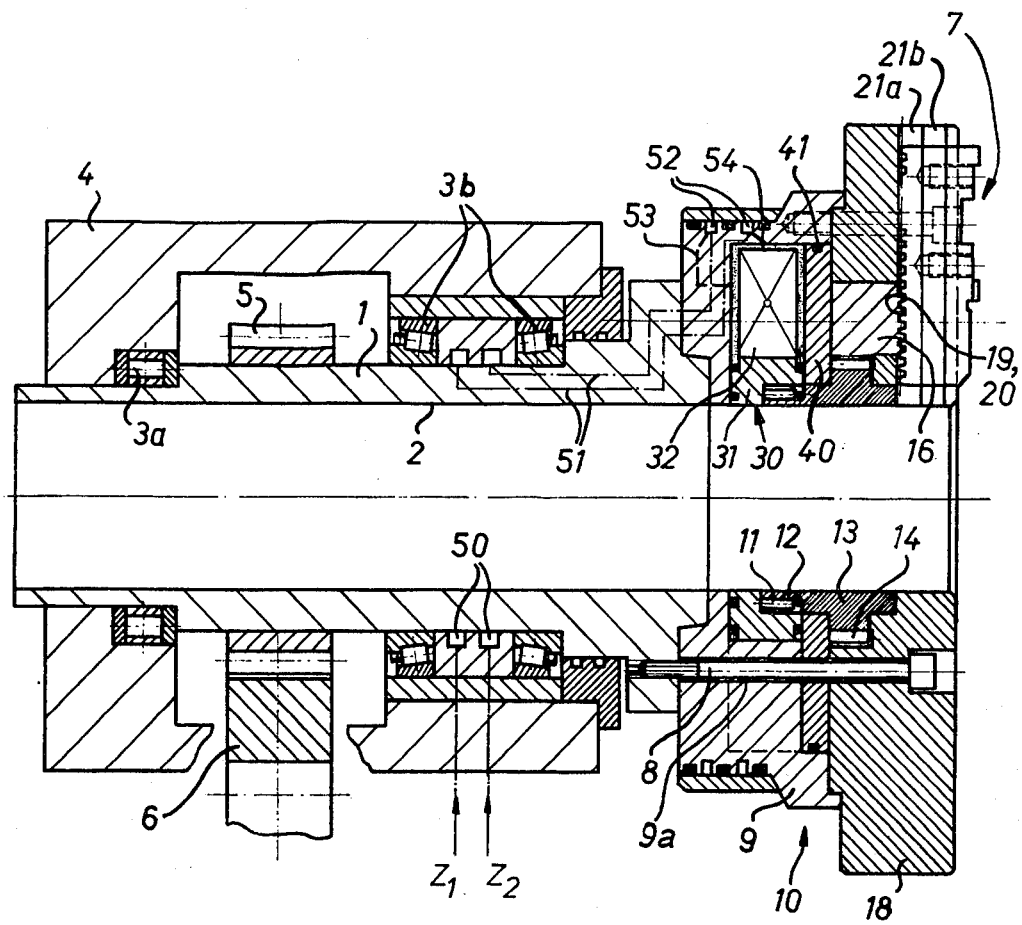
FIG. 1 represents a section through the clamping device according to the invention and through the headstock with a first design of the feeding system for the pressure medium.

Referring now to the drawings in detail, FIG. 1 shows a spindle head of a machine tool. This spindle head includes a spindle flange 1 which comprises a bore 2 for receiving the non-illustrated rotary spindle. The spindle flange 1 is journalled in main bearings 3a, 3b in the headstock 4. Connected to the spindle flange 1 is in a manner known per se a gear 5 which is driven by another gear 6. The chuck proper is designated with the reference numeral 7 and its details will be described further below. The chuck 7 is by means of screws 8 connected to the spindle flange 1. The screws 8 pass through bores 9a in a housing 9 of a rotary piston unit 10 so that a rigid connection is established between the chuck 7, the rotary piston unit 10, and the spindle flange 1. The unit 10 is through a gearing 11 drivingly connected to an extension 12 of a driving wheel 13 which extension projects in a sleeve-like manner and is arranged coaxially with regard to the unit 10. This wheel 13 which is driven by the unit 10 is furthermore provided with additional teeth or a gearing 14. The further power transmission onto the chuck jaws of chuck 7 is known and may be of the type described in the above mentioned German Pat. No. 2,007,509.

Figure 2:
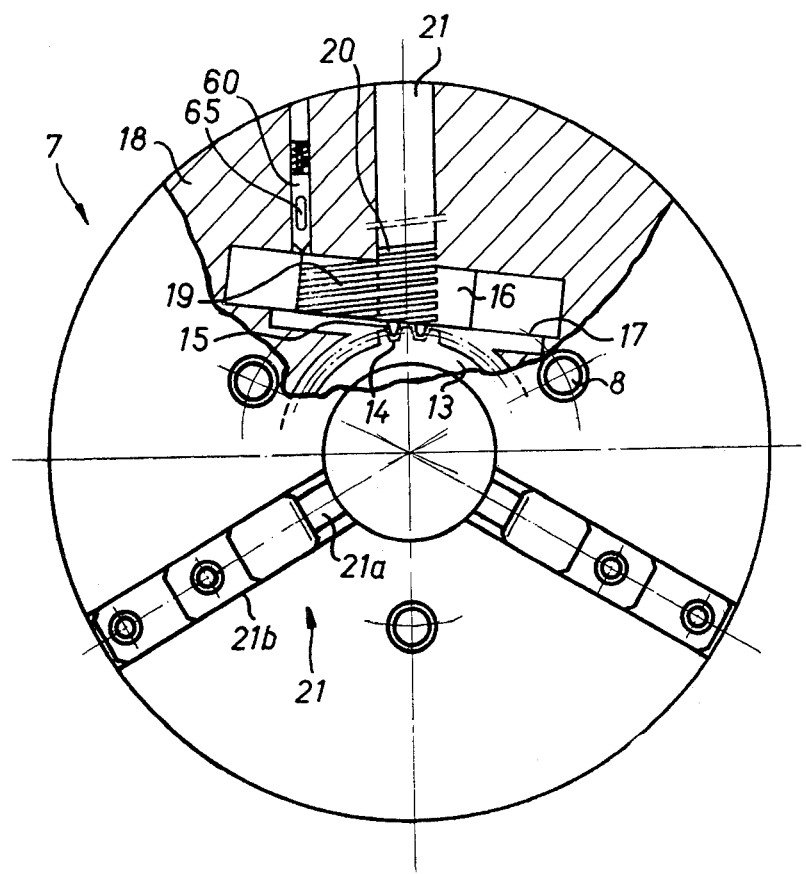
FIG. 2 is a view partially in section as seen from the end face of the chuck.

According to FIG. 2, the driving wheel 13 acts through the above mentioned gearing 14 upon three racks 16 which are tangentially offset to said driving wheel 13 by 120° each with regard to each other, said racks 16 being provided with a first gearing 15. These racks 16 are so journalled in guiding means 17 provided in the chuck housing 8 that each one of them can move in longitudinal direction. By means of a second gearing 19 which is designed as a helical gearing, each rack 16 is in mesh with the gearing 20 of the corresponding chuck jaw 21. Each chuck jaw comprises in customary manner a so-called jaw unit which means a base jaw 21a with an auxilliary jaw 21b (FIG. 1) which is screwed on or is designed as so-called monoblock jaw consisting of one piece. The gearing 20 is arranged on the base jaw 21a. The axial displacement of the racks 16 is thus by means of the gearings 19, 20 converted into a radial clamping movement of the chuck jaws 21. The gearing 19 is expediently designed so long that for purposes of exchanging the chuck jaws 21, the gearing 19 can by a sufficient axial displacement of the racks 16 in their guiding means 17 be disengaged from the gearing 20.

Figure 3:
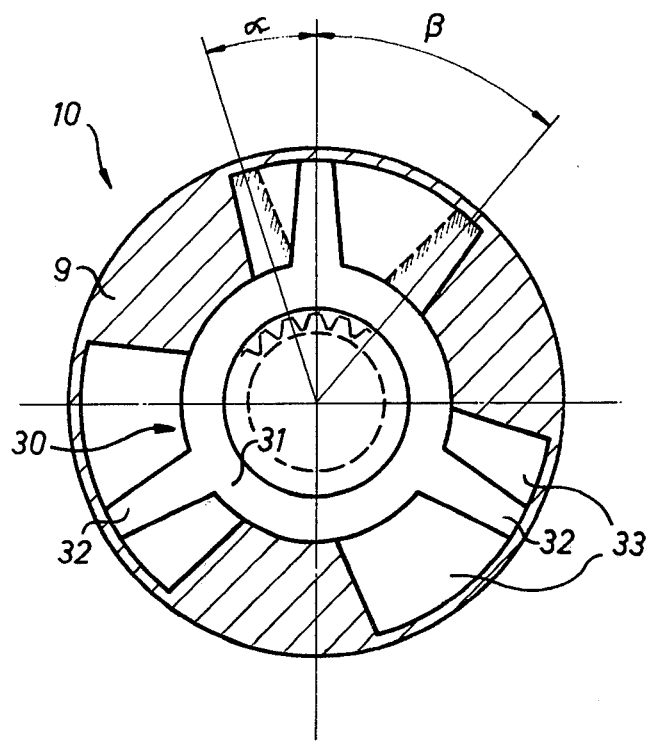
FIG. 3 represents a section through the rotary piston unit.

The rotary piston unit 10 is likewise known per se. It is, therefore, shown only diagrammatically in FIG. 3 and will be explained only to such an extent as it is necessary for understanding the present invention. Arranged in the above mentioned housing 9 is a rotary piston 30 which comprises a hub 31 from which three piston wings 32 project radially. Each of these piston wings respectively moves in an arc-shaped chamber 33 provided in the housing 9. The pivoting range $\beta$ is that in which the racks 16 actuate the chuck jaws 21. In the pivoting range $\alpha$, the gearing 19 of the rack 16 is out of mesh with the gearing 20 of the chuck jaws so that the racks 16 can be exchanged. The hub 31 is hollow to permit the spindles passing through. For purposes of moving the piston wings, the latter are acted upon by hydraulic fluid in both directions depending on the actuation of the chuck, for opening or clamping. This brings about the above mentioned pivoting movement of the rotary piston and thus, through the above mentioned transmitting elements effects the clamping of the jaws. The conduits for the pressure fluid are clearly shown in FIG. 1.

The housing 9 of the rotary piston unit 10 is open on that side which faces the chuck 7. This opening is covered by a circular pressure disc 40 which is arranged coaxially with regard to the sleeve-shaped extension 11. The pressure disc 40 thus also forms one wall of the chambers 33. A circular seal 41 prevents the escape of fluid. The pressure disc 40 is elastic so that it is able to bend somewhat in the manner of a dish spring, under the pressure of the liquid. This bend which is effected in axial direction of the clamping jaw 7 or rotary spindle (in FIG. 1 toward the right) permits a free pivoting of the piston wings 32. If, for some reason, the pressure in the chambers 33 drops unduly, the bend of the pressure disc 40 ceases. As a result thereof, the pressure disc 40 engages the piston wings 32 and blocks the same. Thus, during the operation of the machine tool it is assured that in case of failure of the pressure medium, the chuck cannot unclamp, so that according to the present invention, the workpiece will be firmly held even if no pressure acts upon the pistons.

The feeding of hydraulic fluid to the rotary piston unit is in conformity with the embodiment of FIG. 1 effected by a feeding system which comprises primarily two annular chambers 50, said feeding system being located on the spindle flange between the main bearings 3b. The two annular chambers are at one spot connected to radially extending feeding lines $Z_1$, $Z_2$ which are connected to a pump not shown in the drawing. The arrangement of the feeding lines between the main bearings 3b is favorable inasmuch as these main bearings due to the high stresses acting thereupon anyhow require an intensive lubrication and cooling. From the annular chambers 50 conduits 51 lead through the spindle flange 1 to additional annular chambers 52 in the housing 9. The hydraulic liquid passes from said chambers 52 through conduits 53, 54 into the chambers 33. The course of these conduits is according to FIG. 1 illustrated merely for the sake of clarity. The actual course may, of course, be different.

Figure 4:
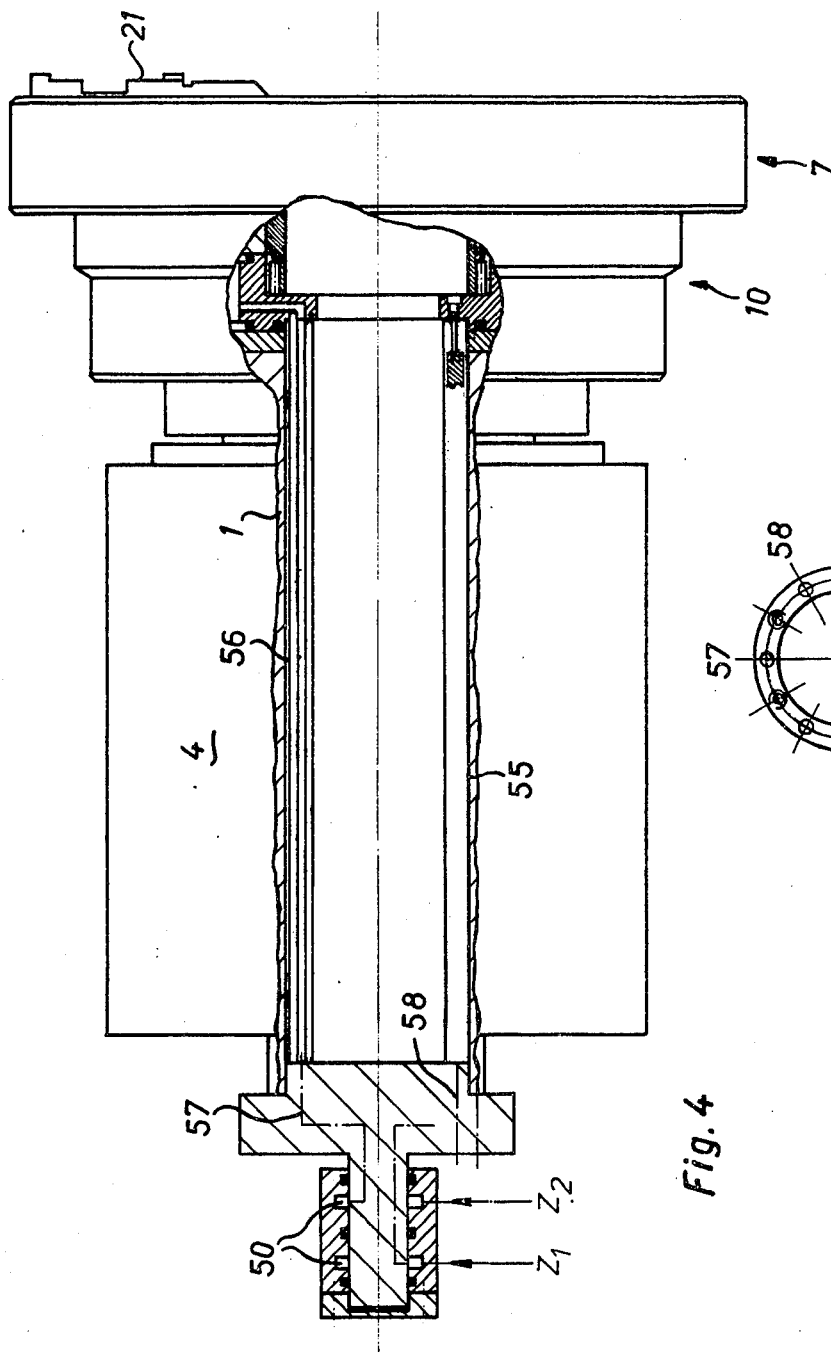
FIG. 4 illustrates another embodiment of the feeding system for the pressure medium.
Figure 5:
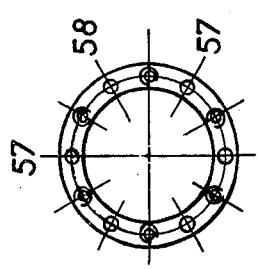
FIG. 5 is a view of the end face of the feeding pipe in FIG. 4.

With the second embodiment according to FIGS. 4 and 5, the oil feeding system is with the annular chambers 50 and the feeding lines $Z_1$, $Z_2$ located at the rear end of the spindle. This design is particularly suitable wherever the arrangement of a feeding ring between the main bearings is not possible and a limitation of the spindle bore through the passage of the hydraulic conduits has to be accepted. The connection between the annular chambers 50 and the bearings 3 of the rotary unit 10 is assured by a tube 55 which coaxially surrounds the spindle and which has longitudinal bores 56. These longitudinal bores form the continuation of the conduits 57, 58 leading away from the annular chambers 50.

Machine tools, especially rotary machines, have to be provided with a locking device which will avoid that when the chuck jaws are in open condition, the machine will accidentally be turned on. Such blocking device can with the illustrated compact arrangement of rotary piston unit and chuck be realized in a particularly favorable manner while nevertheless such blocking device can be arranged outside the chip-removing space of the machine tool.

FIGS. 6 and 7 illustrate two embodiments of such blocking device. For realizing the desired blocking, the racks 16 are taken advantage of. The position of said racks is scanned or felt and the obtained information indicates whether the chuck jaws are in opened or closed condition. FIG. 6 illustrates a first embodiment of such control lock while all parts not necessary for the understanding of the invention have been omitted. Such control lock is not illustrated in FIG. 1 to save space. On each rack 16 there is provided a pin 60 with a rounded end 61 which slides in a bore 62 and which by means of a spring 63 is always pressed against the rack 16. Pin 60 has its shank 64 provided with a recess 65 which slanted surfaces. Mounted in said recess 65 in a horizontally extending first bore 66 is a pivot 67 with a pointed end 68 which latter in a suitable position of the recess 65 can engage the latter. The pivot 67 is by means of a head 69 of a control rod 70 which is under the pressure of a spring 71 and slides in a further bore, continuously pressed against the shank 64 of pin 60. The control rod 70 projects at the opposite end from the housing 9 of the rotary piston unit 10. Here is arranged a control ring 72 which by means of an annular extension 73 is loosely guided in a recess 74 of housing 9.

The operation is as follows: the control pin 60 occupies such a position relative to the rack 16 (FIG. 2) that said pin does not contact rack 16 when the chuck jaws are in clamping position so that pin 60 due to the thrust of spring 63 extends into the guiding means 17. If, for loosening the chuck jaws, the rack 16 is displaced (in FIG. 2 toward the left), it will contact the pin 60 and lift the latter. This brings about a lifting of the recess 65. As a result thereof, the pin 67 and the control rod 70 are displaced toward the left, and the rod 70 then presses upon the control ring 72 which is likewise displaced toward the left and in this way is usable for actuating symbolically indicated electric control members 75, 76. It should be borne in mind in this connection while the control ring 72 is stationary, the housing 9 and the above mentioned elements 60-71 rotate when the turning machine is in operation. The contact between the control rod 71 and the control ring 72 occurs, however, in conformity with the purpose of the device, only at the standstill of the turning machine. During the rotation, the control rod 70 has no contact with the control ring 72.

The division of the connection between the control pin 60 and the control ring 72 into two elements 67 and 70 with the longitudinal axes offset with regard to each other is primarily due to reasons of space because only relatively little space is available for mounting said elements 67 and 70. However, it is possible under suitable conditions to provide only one control rod 70 extending all the way through, which control rod 70 has a point 68 for engaging the recess 65.

Expediently, the elements 67, 70 and 71 are arranged in those sections of housing 9 which separate the chambers 33 from each other. The control ring 72 may also be designed differently as will be evident from FIG. 7. FIG. 7 principally represents a cut-out from FIG. 6 on an enlarged scale while, however, the changes now being described are effected and illustrated. Thus, the control ring 72 has a bevel or inclined surface 77 pressed upon by a control pin 78 of a switch 79. A displacement of the control ring 72 toward the left or toward the right will then bring about a lifting or a lowering of the control pin 78 and thus a shifting over of switch 79. It should, however, be borne in mind that naturally each of the three racks is connected to the above mentioned members 60, 67, 70. The control ring 72 is thus simultaneously actuated by three control rods 70. As will be evident from the above, the control ring 72 is located outside the chip removing space of the machine and thus is protected against chips and cooling fluid but can nevertheless be actuated in a simple manner so that by means of its position the respective position of the rack 16 can easily be ascertained. This is of primarily importance when exchanging the jaws 21.

It is, of course, to be understood that the present invention is, by no means, limited to the specific showing in the drawings, but also comprises any modifications within the scope of the appended claims.

What is claimed is:

1. In a chucking device, especially for a turning machine, having a chuck body and jaws guided for radial movement on one side of the chuck body; a bar longitudinally moveable in the chuck body transversely to the direction of movement of each jaw and each jaw and bar having meshing teeth which effect radial movement of the jaw in response to movement of the bar in the chuck body, a gear on the axis of the chuck in the plane of said bars and to which each bar is tangential, each bar having gear teeth on the side facing the gear and engaging the teeth on the gear, a rotary piston directly coupled to said gear and having radial wings thereon, cavity means in the chuck body having discrete chambers each having a said wing therein, and means for supplying actuating fluid to said chambers on one side of said wings to move said jaws radially inwardly and on the other side of said wings to move said jaws radially outwardly.

2. A chucking device according to claim 1 in which each jaw is slidable in a respective radial groove extending into said body from the outer periphery thereof and each bar has one end position in which the teeth thereon disengage from the teeth on the respective jaw so the jaw can be removed from the chuck body by radially outward movement in the respective groove.

3. A chucking device according to claim 1 in which said rotary piston comprises a central hub to which said wings are connected, said hub having internal splines and said gear having a splined axial portion engaging the splines on said rotary piston.

4. A chucking device according to claim 1 in which said cavity means is formed axially into said chuck body from one side thereof so as to be open in one axial direction, a cover plate mounted on said body and closing the open end of said cavity means and confining said rotary piston and the piston wings therein in said cavity means, said cover plate clampingly engaging said rotary piston in the absence of pressure in said cavity means and yielding axially when pressure is supplied to said cavity means to release said piston for movement of the wings thereof in the respective chambers of said cavity means.

5. A chucking device according to claim 4 which includes a spindle on one side of said chuck body and a jaw plate on the other side in which said jaws are radially slidable, said cover plate being disposed between said jaw plate and said chuck body, and bolts extending through said jaw plate and cover plate and chuck body and into said spindle for nonrotatable interconnection of the plates and body and spindle.

6. A chucking device according to claim 1 which includes a spindle connected to said chuck body and extending axially therefrom on the side opposite said jaws, a torsion free feed sleeve coaxial with said spindle and having passage means therein connected to said chambers on opposite sides of the wings therein.

7. A chucking device according to claim 1 which includes control switches to control the turning machine, a control ring movable for actuating said switches, and means operated by movement of said jaws toward and away from workpiece clamping position for moving said control ring to actuate said switches.

8. A chucking device according to claim 1 which includes pin means in said chuck body which move transversely therein in response to movement of said jaws in workpiece clamping direction, rod-like elements moveable axially in said chuck body in response to movement of said pin means when the jaws move in workpiece clamping direction, a control ring coaxial with said chuck body and adapted to be engaged and moved by said rod-like elements, and switch means positioned to be controlled by movement of said control ring and adapted to be connected in controlling relation to said turning machine.

* * * * *